(No Model.)
A. C. EVANS.
SEEDING MACHINE.
No. 370,611. Patented Sept. 27, 1887.
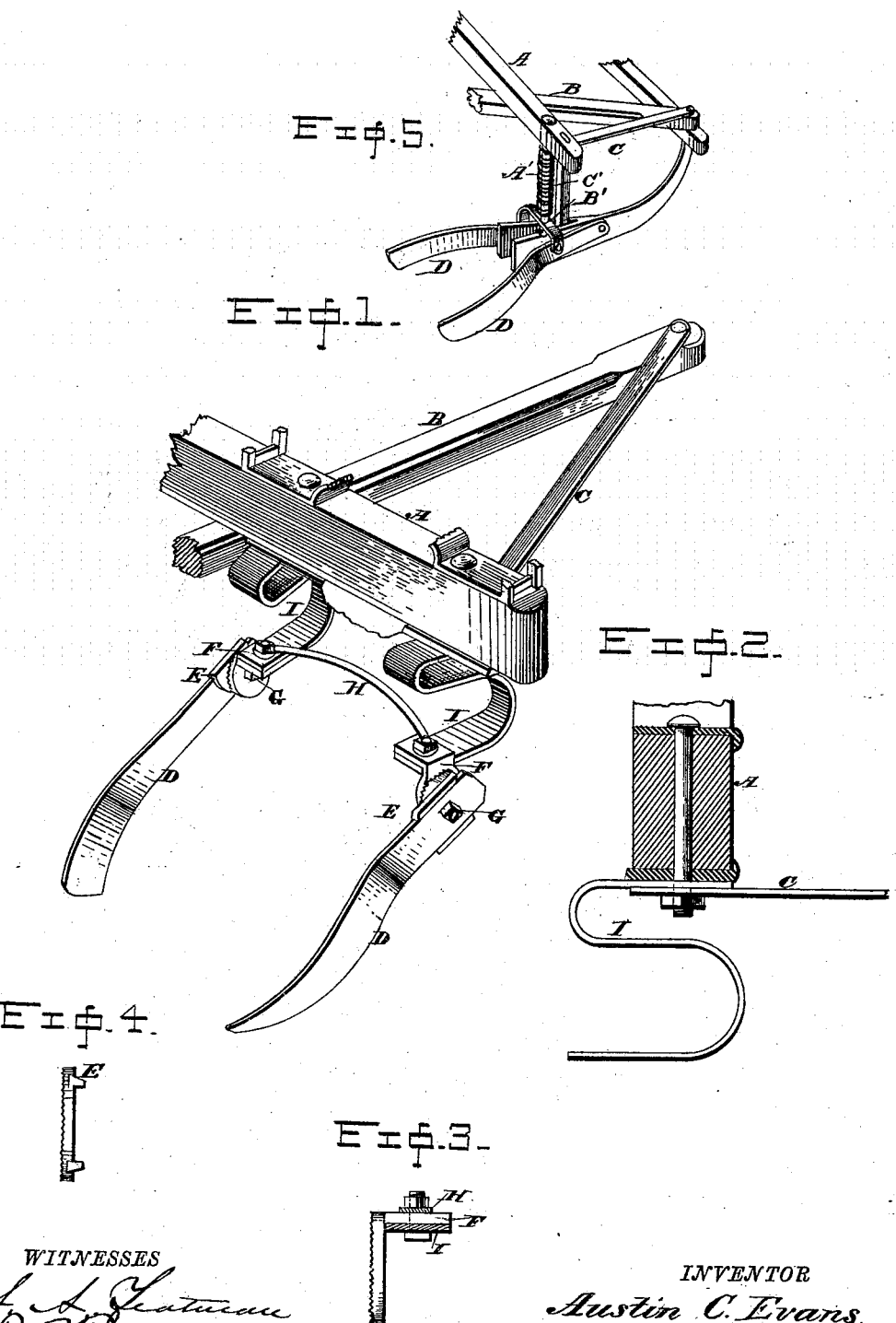
WITNESSES
INVENTOR
Austin C. Evans,
By H. A. Toulmin,
his Attorney,

UNITED STATES PATENT OFFICE.

AUSTIN C. EVANS, OF SPRINGFIELD, OHIO.

SEEDING-MACHINE.

SPECIFICATION forming part of Letters Patent No. 370,611, dated September 27, 1887.

Application filed May 12, 1887. Serial No. 237,946. (No model.)

*To all whom it may concern:*

Be it known that I, AUSTIN C. EVANS, a citizen of the United States, residing at Springfield, in the county of Clark and State of Ohio, have invented certain new and useful Improvements in Seeding-Machines, of which the following is a specification, reference being had therein to the accompanying drawings.

This invention relates to improvements in seeding-machines, and has special reference to corn-planters.

My invention consists in so connecting the shovels or coverers with the machine that the shovels may yield to obstructions—as stones—met with in the field, and may pass over them without raising or affecting the machine.

My invention further consists of a spring and a shovel connected to one end thereof, while the other end of the spring is adapted to connect with the frame or box-beam of the machine.

My invention still further consists of the spring and the shovel and an adjustable connection between them.

In the accompanying drawings, forming a part of this specification, and on which like reference-letters indicate corresponding parts, Figure 1 represents a perspective view of a portion of the forward end of a corn-planter, showing my improved shovel-connection; Fig. 2, a sectional view of the beam and the spring in side elevation; Fig. 3, a detached view of the connecting-bracket and a sectional view of the spring; Fig. 4, a detail sectional view of a disk, and Fig. 5 a perspective view of a modified manner of connecting the shovels or coverers with the machine.

The letter A designates the box-beam of a corn-planter, of any approved construction, and the letters B and C, respectively, one of the hound beams and braces, which are also of the usual construction.

The letter D designates the shovels. The shovels of themselves are not materially different from the approved types. Their upper ends are fitted into seats formed in serrated disks E, and these disks are fitted against correspondingly-serrated depending portions of brackets F, and the several parts are locked together in any adjusted position by means of bolts and nuts G. These brackets are strongly bolted or otherwise secured to the springs which connect the shovels with the machine, and, in the present instance and by preference, the springs are braced together by a bar, H, which serves to counteract any tendency of the springs to move laterally toward or away from each other.

The letter I designates the springs, which are composed of straps of steel bent into the form substantially of the letter S. These springs at their upper ends are bolted or otherwise strongly secured to the frame or box-beam of the machine. By reason of their shape and their position they are capable of holding the shovels down strongly enough to cause them to enter the ground the proper depth to cover the seed, while at the same time their shape and position permit the shovels to rise and ride over any obstruction—as a stone—with which they may meet in the field. This prevents the machine from being jarred or raised, and withal gives the machine great superiority of action. As soon as an obstruction is passed over, the springs immediately return the shovel to the ground.

It is obvious that various forms of springs may be used in lieu of the particular form here shown and described without in any sense departing from the gist of my invention—to wit, a yielding connection between the shovels and the machine proper.

It is also obvious that the connection between the spring and the shovel proper need not be adjustable, yet the adjustment of the shovel with respect to the spring is of advantage, because it allows the shovels to be set more or less deeply into the ground.

In Fig. 5 I have illustrated a modified manner of connecting the shovels or coverers with the machine, consisting of pivotally attaching the same to the runners and in holding them down to the ground by means of a spiral spring, A', bearing upon the cross-bar B' and against one of the frame-beams, and held in place by a rod, C', secured to the beam and extending through the cross-bar B'. The action under this construction is the same or substantially the same as in the other instance, and I illustrate this modification for the purpose of showing that there are several ways of carrying out the essential feature of the invention—namely, the ability of the shovels or coverers to yield (to obstructions) with respect to the machine.

Having thus fully described my invention, what I claim as new, and desire to secure by Letters Patent, is—

1. The combination, with a seeding-machine, of a shovel or coverer constructed to gather the soil and throw it inward, and a spring interposed between the machine and the shovel or coverer and arranged to bear down on it and allow it to yield without disturbing the machine generally and the runners and other parts carried thereby.

2. The combination, with a seeding-machine, of a shovel or coverer constructed to gather the soil and throw it inward and a spring adjustably connected with the shovel and connected with the machine.

3. The combination, with a seeding-machine, of a shovel or coverer and a spring, substantially S-shaped, connecting the shovel or coverer with the machine.

4. The combination, with a seeding-machine, of a shovel or coverer and a spring, substantially S-shaped, adjustably connected with the machine.

5. The combination, with a seeding-machine, of a shovel or coverer and a spring, substantially S-shaped, connected with the machine, a bracket connected to the spring and having a serrated portion and a serrated disk fitted to the said serrated portion, and having a seat for the shovel, and a bolt and nut which connect the parts.

6. The combination, with a box-beam of a seeding-machine and two springs, substantially S-shaped, connected thereto, of shovels or coverers, an adjustable connection, substantially as described, and a rod connecting the springs together.

In testimony whereof I affix my signature in presence of two witnesses.

AUSTIN C. EVANS.

Witnesses:
JESSE A. BUEL,
LIZZIE CHERRY.